(12) United States Patent
Kawamoto et al.

(10) Patent No.: US 7,193,498 B2
(45) Date of Patent: Mar. 20, 2007

(54) METHOD OF PRODUCING TEMPERATURE SENSOR AND MOUNTING SAME TO A CIRCUIT BOARD

(75) Inventors: Tetsuya Kawamoto, Shiga (JP); Hideki Yamada, Shimane (JP); Hiroyuki Kobayashi, Shimane (JP); Minoru Shimada, Shiga (JP); Kingo Ohmura, Shiga (JP); Asami Wakabayashi, Shiga (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 11/438,949

(22) Filed: May 22, 2006

(65) Prior Publication Data

US 2006/0208848 A1 Sep. 21, 2006

Related U.S. Application Data

(62) Division of application No. 09/543,653, filed on Apr. 5, 2000, now Pat. No. 7,075,407.

(30) Foreign Application Priority Data

| Apr. 9, 1999 | (JP) | ................................. 11-102965 |
| May 26, 1999 | (JP) | ................................. 11-146799 |
| Aug. 20, 1999 | (JP) | ................................. 11-234109 |

(51) Int. Cl.
    *H01C 7/10* (2006.01)
(52) U.S. Cl. ..................................... 338/22 R; 338/28
(58) Field of Classification Search ............. 338/22 R, 338/28, 25, 206, 261, 270, 273, 275, 276, 338/302, 315, 318, 319, 320, 322, 327, 332; 29/610.1, 613, 838, 854; 439/620.24, 870
See application file for complete search history.

(56) References Cited

U.S. PATENT DOCUMENTS

| 2,462,162 A | 2/1949 | Christensen et al. |
| 2,879,363 A * | 3/1959 | Mucher ...................... 338/261 |

(Continued)

FOREIGN PATENT DOCUMENTS

DE          20 36 829          1/1972

(Continued)

*Primary Examiner*—Tu Hoang
(74) *Attorney, Agent, or Firm*—Beyer Weaver LLP

(57) ABSTRACT

Temperature sensors are produced by first producing temperature sensing elements each having electrodes on its mutually oppositely facing main surfaces, next forming a lead frame comprising a linearly elongated base part and a plurality of pairs of planar lead parts extending perpendicularly from said base part, twisting each of these planar lead parts such that each of the pairs has top end parts which face each other with a gap therebetween, inserting one of the temperature sensing elements between the mutually facing top end parts of each pair in the corresponding gap and electrically connecting the electrodes on the inserted temperature sensing element individually to the top end parts of the corresponding pair, and cutting each of the planar lead parts from said base part to form lead terminals of specified lengths for the temperature sensors. Each of the planar lead parts is provided with a semicircular kinked part distal from the top end part such that the kinked parts of each of the pairs of planar lead parts are bent in a same direction with respect to each other and in a side-by-side relationship.

4 Claims, 4 Drawing Sheets

U.S. PATENT DOCUMENTS

| | | | |
|---|---|---|---|
| 2,961,625 A | 11/1960 | Sion | |
| 2,980,875 A | 4/1961 | Sivacek | |
| 3,087,134 A | 4/1963 | McOrlly | |
| 3,147,457 A | 9/1964 | Gill et al. | |
| 3,747,045 A | 7/1973 | Stross | |
| 3,793,604 A | 2/1974 | Duggan et al. | |
| 3,832,668 A | 8/1974 | Berman | |
| 3,868,620 A | 2/1975 | McBride, Jr. et al. | |
| 4,214,353 A | 7/1980 | Kalina | |
| 4,276,536 A | 6/1981 | Wisnia | |
| 4,317,102 A | 2/1982 | Vranas | |
| 4,333,069 A * | 6/1982 | Worth et al. | 338/315 |
| 4,514,787 A | 4/1985 | Kaneko et al. | |
| 4,560,973 A | 12/1985 | Grimm et al. | |
| 4,685,025 A * | 8/1987 | Carlomagno | 338/22 R |
| 4,708,558 A | 11/1987 | Musil | |
| 5,239,745 A | 8/1993 | Hofsass | |
| 5,271,410 A | 12/1993 | Wolzinger et al. | |
| 5,321,382 A | 6/1994 | Mizukoshi et al. | |
| 5,367,282 A | 11/1994 | Clem | |
| 5,436,609 A * | 7/1995 | Chan et al. | 338/22 R |
| 6,134,771 A | 10/2000 | Nakamura et al. | |

FOREIGN PATENT DOCUMENTS

| | | |
|---|---|---|
| DE | 23 21 715 C2 | 4/1973 |
| DE | 24 04 758 | 8/1975 |
| DE | 37 03 465 A1 | 2/1987 |
| DE | 690 01 779 T2 | 4/1990 |
| GB | 1 116 364 | 6/1968 |
| JP | 51-82945 | 7/1976 |
| JP | 55-100134 | 2/1982 |
| JP | 58-186483 | 5/1984 |
| JP | 59-68290 | 10/1985 |
| JP | 61-005269 | 1/1986 |
| JP | 61-5269 | 1/1986 |
| JP | 02-156125 | 6/1990 |
| JP | 03-38617 | 2/1991 |
| JP | 03-209704 | 9/1991 |
| JP | 05-79933 | 3/1993 |
| JP | 06-36904 | 2/1994 |
| JP | 08-153601 | 6/1996 |
| JP | 09-306317 | 11/1997 |
| JP | 11-126727 | 5/1999 |

* cited by examiner

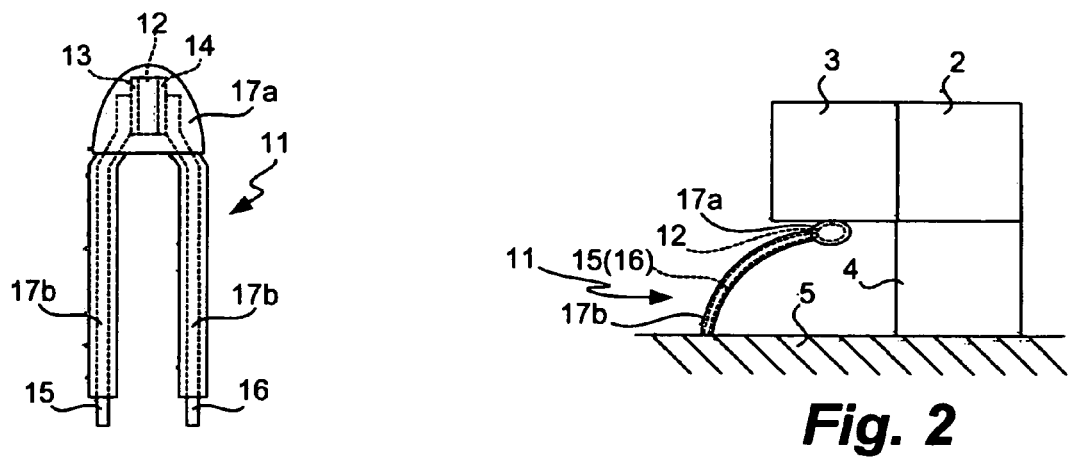
Fig. 1
Fig. 2
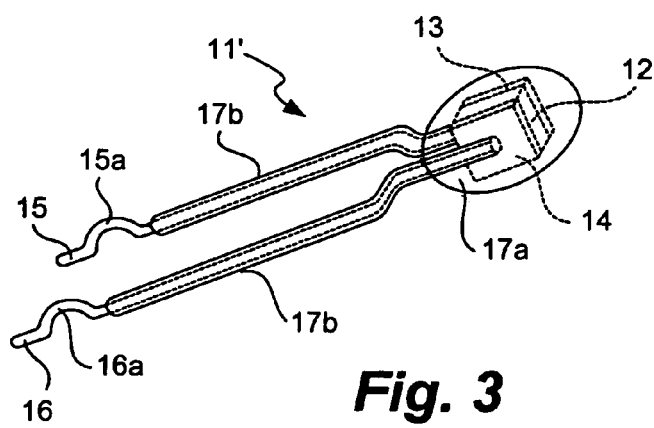
Fig. 3
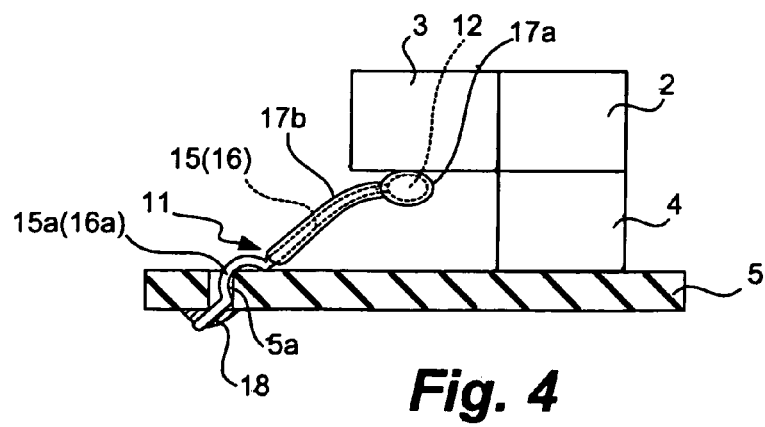
Fig. 4

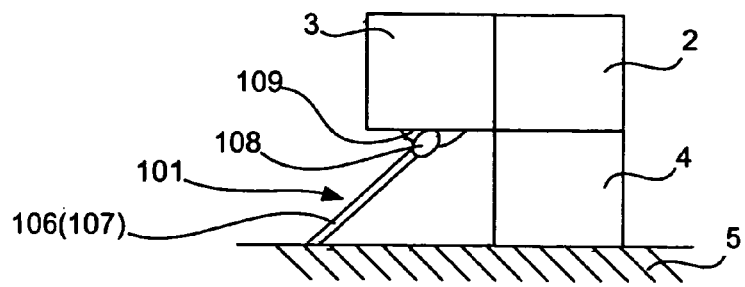
Fig. 10A
*(Prior Art)*
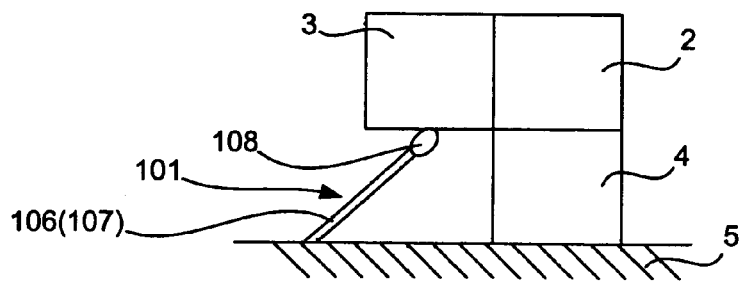
Fig. 10B
*(Prior Art)*
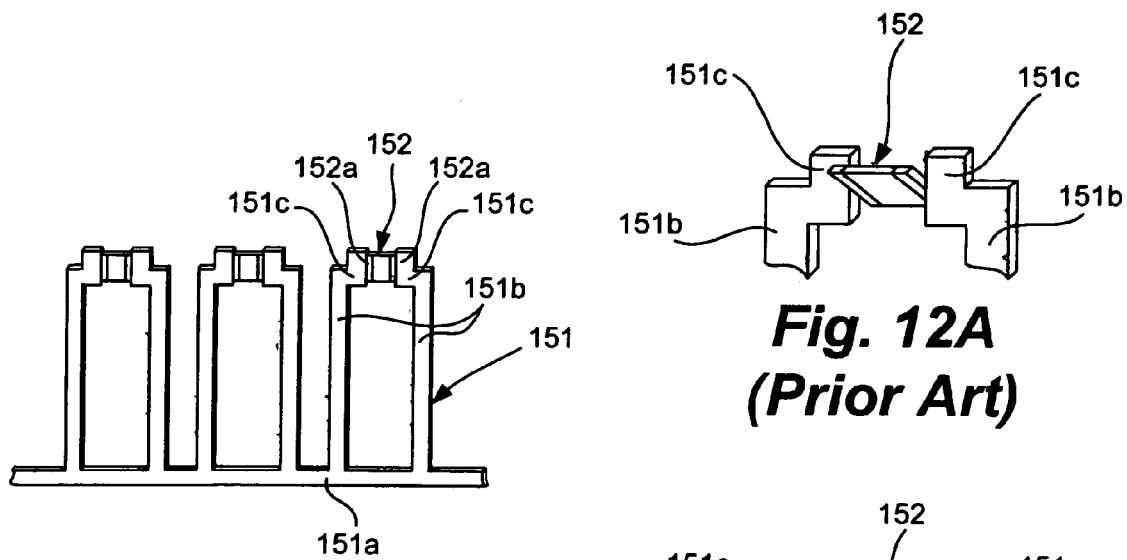
Fig. 11
*(Prior Art)*
Fig. 12A
*(Prior Art)*
Fig. 12B
*(Prior Art)*

METHOD OF PRODUCING TEMPERATURE SENSOR AND MOUNTING SAME TO A CIRCUIT BOARD

This is a divisional of application Ser. No. 09/543,653 filed Apr. 5, 2000, now U.S. Pat. No. 7,075,407.

BACKGROUND OF THE INVENTION

This invention relates to a method of producing a temperature sensor provided with lead lines or planar lead terminals and, more particularly, a temperature sensor comprising a thermistor. The invention also relates to a method of mounting such a sensor to a circuit board.

A thermistor element with a negative temperature coefficient (or an NTC thermistor element) is usually used as the temperature sensing element for such a temperature sensor and is sometimes directly contacted to a target object, such as a CPU carried on a mother board, in order to accurately measure its temperature. FIGS. 10A and 10B show an example of prior art temperature sensor 101 of this type for detecting the heat generated by a CPU 2. The prior art temperature sensor 101 is characterized as having lead lines 106 and 107 which are made, for example, of a plated wire such as a hard copper or steel wire covered with copper or stranded soft copper wires and hence have no elasticity. Thus, it was necessary to use an adhesive agent 109 to securely attach the temperature sensing element 108 of the sensor 101 to the DC fan 3 as shown in FIG. 10A or to adjust the length of the lead lines 106 and 107 according to the distance between the circuit board 5 and the DC fan 3.

By the method of using the adhesive agent 109 to attach the temperature sensing element 108 to the DC fan 3 as shown in FIG. 10A, an extra step for the attachment becomes necessary in the production process and the positioning is not an easy task. By the method of adjusting the length of the lead lines 106 and 107 to make the contact between the temperature sensing element 108 and the DC fan 3 as shown in FIG. 10B, the lengths of the two lead lines 106 and 107 must be individually adjusted. Vibrations of the DC fan 3, furthermore, make it difficult to maintain a constant positional relationship between the temperature sensing element 108 and the DC fan 3, causing difficulties in making an accurate temperature detection.

For producing temperature sensors provided with planar lead terminals, the lead terminals are produced from a lead frame in order to automate the assembly process and to reduce variations in the accuracy in shapes and sizes. FIG. 11 shows a lead frame 151 to which is attached a temperature sensing element 152. The lead frame 151 is molded so as to comprise a linearly elongated belt-shaped base part 151a and a plurality of pairs of planar lead parts 151b extending perpendicularly from the base part 151a. The temperature sensing element 152 is of a structure having terminal electrodes 152a on its two mutually oppositely facing terminal end surfaces and is inserted in the gap between the tip sections 151c of the pair of planar lead parts 151b. The tip sections 151c of the planar lead parts 151b and the terminal electrodes 152a of the temperature sensing element 152 are electrically connected by using a solder material (not shown) or the like.

It is not easy, however, to thus insert temperature sensing elements 152 into the gaps formed on the lead frame 151 in a neatly aligned manner in the direction of the thickness because the contact surface areas between the tip sections 151c of the planar lead parts 151b and the temperature sensing element 152 are small. Even after temperature sensing elements are inserted, another problem is that they cannot always be positioned stably with respect to the tip sections 151c of the planar lead parts 151b in terms of the orientation (as shown in FIG. 12A) or the position (as shown in FIG. 12B).

SUMMARY OF THE INVENTION

It is therefore an object of this invention to provide a method of producing an improved temperature sensor having elastic lead lines with spring characteristics such that its temperature sensing element and a target object for temperature measurement can be dependably contacted.

It is another object of this invention to provide a method of producing such a temperature sensor which is designed such that its lead lines will bend in a desired direction and hence that its temperature sensing element and the target object can be even more dependably contacted.

It is further an object of this invention to provide a method of mounting such a temperature sensor to a printed circuit board.

It is still another object of this invention to provide a method of producing a temperature sensor with its lead terminals and the temperature sensing element connected securely and dependably, as well as a method of producing such temperature sensors.

A temperature sensor to be produced by a method of this invention may be characterized as comprising a temperature sensing element such as an NTC thermistor element with electrodes thereon, and elongated electrically conductive lead lines made of an elastic material each attached to a corresponding one of these electrodes. The lead lines may preferably each have a non-straight part such that, when these lead lines are inserted into throughholes prepared through a base board, the non-straight parts are hooked at the throughholes and the portions of the lead lines above the base board will stand up obliquely. These non-straight parts may be formed each as a semi-circular kinked part by bending all in a same direction so as to be in a side-by-side relationship. The temperature sensing element and the lead lines may be covered by an electrically insulating material, except for the kinked parts.

Another temperature sensor to be produced by a method of this invention may be characterized as having its lead terminals and temperature sensing element connected securely and dependably, may be characterized as comprising a temperature sensing element such as an NTC thermistor element with electrodes on mutually oppositely facing surfaces thereof and a pair of elongated electrically conductive planar lead terminals each being twisted such that their top end parts face each other with a gap therebetween and the temperature sensing element is sandwiched between the top end parts in this gap.

Such temperature sensors with twisted planar lead terminals can be produced by producing temperature sensing elements each having electrodes on its mutually oppositely facing main surfaces, forming a lead frame comprising a linearly elongated base part and a plurality of pairs of planar lead parts extending perpendicularly therefrom, twisting each of these planar lead parts such that each of these pairs has top end parts which face each other with a gap in between, inserting these temperature sensing elements each between the mutually facing top end parts of a corresponding one of these pairs of planar lead parts, electrically connecting the electrodes to the top end parts of, and cutting each of the planar lead parts from the base part to form lead terminals of specified lengths.

BRIEF DESCRIPTION OF THE DRAWINGS

The accompanying drawings, which are incorporated in and form a part of this specification, illustrate embodiments of the invention and, together with the description, serve to explain the principles of the invention. In the drawings:

FIG. 1 is a front view of a temperature sensor to be produced by a method of this invention;

FIG. 2 is a sketch of the temperature sensor of FIG. 1 when it is being used for detecting the temperature of a target apparatus;

FIG. 3 is a diagonal view of a variation of the temperature sensor to be produced by a method of this invention;

FIG. 4 is a sketch of the temperature sensor of FIG. 3 when it is being used for detecting the temperature of a target apparatus;

FIGS. 10A and 10B are sketches of a prior art temperature sensor when it is being used for detecting the temperature of a target apparatus;

FIG. 11 is a diagonal view of a lead frame with temperature sensing elements attached to it for producing prior art temperature sensors; and FIGS. 12A and 12B are sketches of prior art temperature sensors with their temperature sensing elements displaced.

Throughout herein, some like or equivalent components such as the target apparatus of which the temperature is being detected are indicated by the same numerals and may not necessarily be described repetitiously.

DETAILED DESCRIPTION OF THE INVENTION

Figure 5:
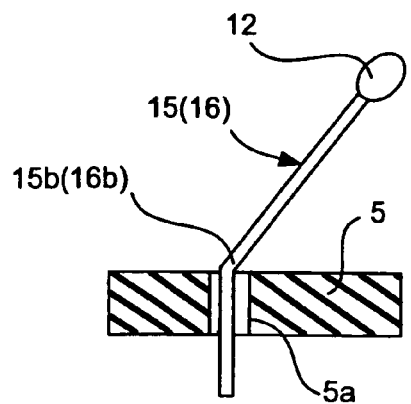
FIG. 5 is a partially sectional horizontal view of another variation of the temperature sensor to be produced by a method of this invention.

The invention is described next by way of examples. FIG. 1 shows a temperature sensor 11 according to one embodiment of this invention, comprising an NTC thermistor element 12 having a pair of terminal electrodes 13 and 14 formed on its mutually oppositely facing main surfaces, lead lines 15 and 16 each with one end attached to a corresponding one of these terminal electrodes 13 and 14 (say, by a solder material (not shown)), first outer cover 17a of an electrically insulating resin material covering the thermistor element 12 and a second outer cover 17b of also an electrically insulating resin material covering the lead lines 15 and 16 except over their other ends. The terminal electrodes 13 and 14 may comprise Ag, Cu, Au, Pt or an alloy containing any of these. The NTC thermistor element 12 may not necessarily be in the shape of a chip but may be planar, for example, of a circular disk shape.

According to an example, the lead lines 15 and 16 comprise phosphor bronze with hardness ½H, having a circular sectional shape with diameter 0.4 mm. The material for the lead lines 15 and 16 may also be german silver, beryllium, SUS, a Cu—Ti alloy, brass or any of these with plating, as long as it has more spring-like elastic characteristic than a hard copper or steel line covered with a copper covering.

The first outer cover 17a is for the purpose of protecting the NTC thermistor element 12 from the environment and also for keeping it electrically insulated, comprising, for example, an epoxy resin or a phenol resin with superior insulating characteristic and resistance against heat. The second outer cover 17b is preferably of a material such as a polyethylene resin that is not only electrically insulating but also elastic and flexible, corresponding to the spring-like elastic characteristic of the lead lines 15 and 16. In such a case, a polyethylene resin or a silicone resin may be favorably used. Alternatively, an insulating tube may be used to cover the lead lines 15 and 16.

As shown in FIG. 2, the temperature sensor 11 thus structured was tested by contacting its thermistor element 12 to the DC fan 3 connected to a CPU 2 in order to detect its temperature. The length of the lead lines 15 and 16 was made somewhat longer than the vertical separation between the DC fan 3 and the printed circuit board 5 supporting the thermistor element 12 such that an elastic contact was accomplished with a biasing compressive force between the DC fan 3 and the thermistor element 12 because the lead lines 15 and 16 were of a material having a spring-like elastic characteristic.

If the lead lines 15 and 16 are simply inserted into throughholes (not shown) through the printed circuit board 105 in a direction more or less perpendicular to its surface and the CPU 2 with the DC fan 3 is lowered from above after the temperature sensor 11 is fastened to the circuit board 5 (say, by soldering), the lead lines 15 and 16 may fail to bend in the desired direction or be crushed by the vertical downward force. According to a preferred variation to the first embodiment of the invention, as shown generally at 11 in FIG. 3, kinked parts 15a and 16a are provided respectively to the lead lines 15 and 16 where the lead lines 15a and 16a are bent in the same direction in a nearly semi-circular arcuate form, each of the kinked parts 15a and 16a being sandwiched between two mutually colinearly extending portions. The second outer cover 17b according to this embodiment is made somewhat shorter so as not to cover the kinked parts 15a and 16a for the convenience in the operations for mounting the sensor 11' to the printed circuit board 5 by inserting the lead lines 15 and 16 into throughholes 5a provided through the circuit board 5 and soldering them thereto. In other aspects, the sensor 11' is identical to the sensor 11 described above with reference to FIG. 1.

As shown in FIG. 4, the temperature sensor 11' thus improved was tested similarly by contacting its thermistor element 12 to the DC fan 3 connected to a CPU 2. The length of the lead lines 15 and 16 between the thermistor element 12 and the kinked parts 15a and 16a was made somewhat longer than the vertical separation between the DC fan 3 and the printed circuit board 5 such that an elastic contact was accomplished with a biasing compressive force between the DC fan 3 and the thermistor element 12. The circuit board 5 used for this test had thickness 1.6 mm, having throughholes 5a with diameter 1 mm.

As the sensor 11' is set on the circuit board 5 with the lead lines 15 and 16 inserted perpendicularly into their respective throughholes 5a, its downward motion is stopped when the kinked parts 15a and 16a hit against the top surface of the circuit board 5. In order to further advance the lead lines 15 and 16 downward, the lead lines 15 and 16 are tilted in the direction opposite to the direction in which the kinked parts 15a and 16a are curved. By thus maneuvering the sensor 11', the lead lines 15 and 16 can be further partially inserted into the throughholes 5a until the lower ends of the arcuate kinked parts 15a and 16a become stuck against the inner walls of the throughholes 5a. By this time, the bottom ends of the lead lines 15 and 16 have penetrated the throughholes 5a and are on the other side of the circuit board 5, although the top portions of the arcuate lead lines 15 and 16 are still above the top surface level of the circuit board 5, as shown in FIG. 4.

With the kinked parts 15a and 16a thus hooked and anchored to the throughholes 5a, the sensor 11' is less likely to be dislocated from the circuit board 5 even if there are vibrations, or to fall in the direction opposite to the direction in which it is tilted. The sensor 11' is then fastened to the circuit board 5 by applying a solder material 18. Since the sensor 11' is thus obliquely oriented already when the CPU 2 is lowered from above, the lead lines 15 and 16 do not bend in a wrong direction as the DC fan 3 presses the thermistor element 12 downward. Since the lead lines 15 and 16 are made of an elastic flexible material, as explained above, the thermistor element 12 remains in contact with the DC fan 3 securely and dependably.

As a variation, the lead lines 15 and 16 may each be formed, as shown in FIG. 5, with a bend 15b or 16b instead of a kinked part such that, as they are perpendicularly inserted into the corresponding throughholes 5a in the circuit board 5, the top parts supporting the thermistor element 12 become automatically tilted. The angle of the bend may be appropriately selected between 0 and 90°.

Figure 6A:
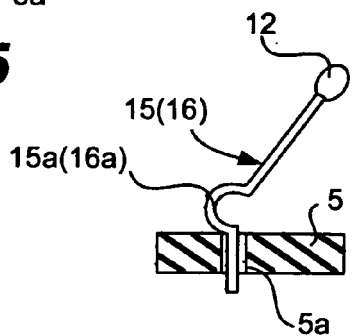
FIGS. 6A and 6B are partially sectional horizontal views of still other variations of the temperature sensor to be produced by a method of this invention.
Figure 6B:
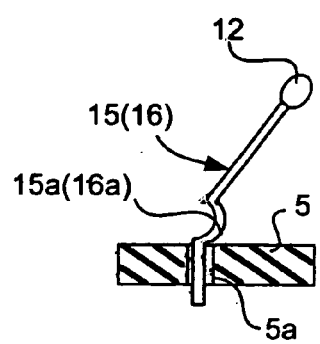

FIGS. 6A and 6B show further variations wherein the lead lines 15 and 16 are each provided with both a kinked part 15a or 16b designed such that the portions on both sides of each kink (or the semi-circularly arcuate part) make a specified angle between 0 and 90°.

Figure 7:
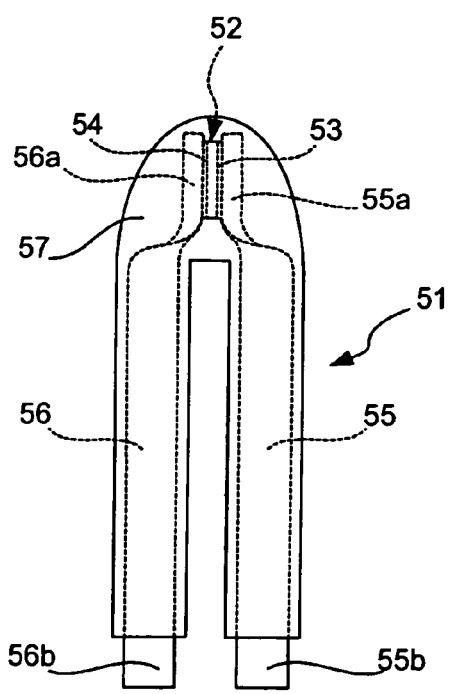
FIG. 7 is a front view of another temperature sensor to be produced by a method of this invention.

FIG. 7 Shows a temperature sensor 51 according to a second embodiment of this invention, comprising an NTC thermistor element 52 having a pair of terminal electrodes 53 and 54 formed on its mutually oppositely facing main surfaces, lead terminals 55 and 56 each with its top end parts 55a or 56a attached to a corresponding one of these terminal electrodes 53 and 54 (say, by a solder material (not shown)) and an outer cover 57 of an electrically insulating resin material covering the thermistor element 52 and the lead terminals 55 and 56 except their bottom end parts 55b and 56b. The NTC thermistor element 52 may not necessarily be in the shape of a chip but may be planar, for example, of a circular disk shape.

The lead terminals 55 and 56 may comprise phosphor bronze with hardness ½H and are planar, having a rectangular cross-sectional shape. The material for the lead terminals 55 and 56 may also be german silver, beryllium, SUS, a Cu—Ti alloy, brass or any of thee with plating. The lead terminals 55 and 56 are twisted by 90° at a position proximal to their top end parts 55a and 56a such that the direction of thickness for the top end parts 55b and 56b is different from that of the bottom end parts 55b and 56b by 90°. In other words, although the bottom end parts 55b and 56b of the lead terminals 55 and 56 are parallel to each other, their top end parts 55a and 56a face each other with a gap in between.

Figure 8:
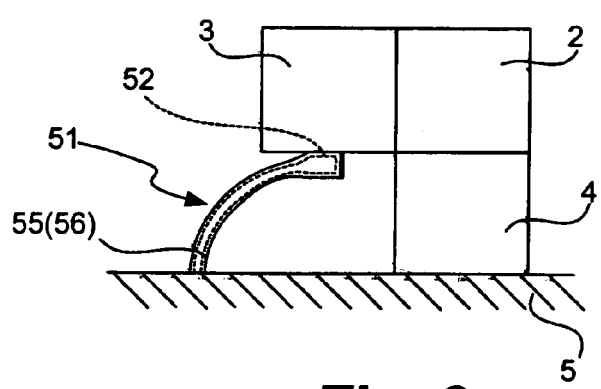
FIG. 8 is a sketch of the temperature sensor of FIG. 7 when it is being used for detecting the temperature of a target apparatus.

FIG. 8 shows the temperature sensor 51 thus structured being set on a base board 5 to measure the temperature of the DC fan 3 of a CPU 2 set also on the same base board 5 through a socket 4. Because the lead terminals 55 and 56 are made of an elastic material with a spring-like characteristic, the NTC thermistor element 52 can remain in contact with the DC fan 3 reliably even without the use of any adhesive agent therebetween or having the lengths of the lead terminals 55 and 56 carefully adjusted.

The outer cover 57 may comprise a polyethylene resin. When a same resin material is used to cover both the NTC thermistor element 52 and the lead terminals 55 and 56, a silicone resin may be used as well as a polyethylene resin. As explained with reference to FIG. 1, the outer cover 57 may be separated into a part for covering the NTC thermistor element 52 and another part for covering the lead terminals 55 and 56. The cover for the NTC thermistor element 52 is for protection against the environment and to keep it electrically insulated. For this reason, an epoxy resin, a phenol resin or a glass material with superior insulating characteristic and resistance against heat is preferred. The part of the outer cover 57 for the protection of the lead terminals 55 and 56 should preferably be of a material such as a polyethylene resin that is not only electrically insulating but also flexible, corresponding to the spring-like elastic characteristic of the lead terminals 55 and 56.

The temperature sensors 51 may be produced first by preparing many NTC thermistor elements 52 having formed thereon terminal electrodes 52 comprising Ag, Cu, Au, Pt or their alloy so as to serve as temperature sensing elements. Let the dimensions of these NTC thermistor elements 52 be 0.3–1.5 mm in length, 0.3–1.5 mm in width and 0.3–10 mm in height.

Figure 9A:
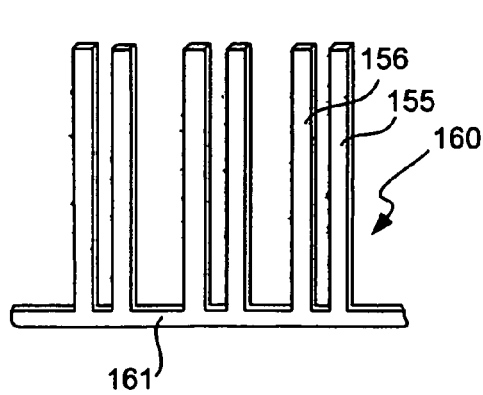
FIGS. 9A, 9B, 9C and 9D are diagonal views showing temperature sensors to be produced by a method of this invention at different stages of their production.

Next, lead frames 160 each having a linearly elongated belt-like base part 161 and a plurality of pairs of planar lead parts 155 and 156 perpendicularly extending therefrom, as shown in FIG. 9A, are prepared. Such lead frames 160 may be formed, for example, by a chemical etching or press method on a metallic plate comprising phosphor bronze. Each of the planar lead parts 155 and 156 may be 0.3–0.6 mm in width and 0.2–0.3 mm in thickness.

Figure 9B:
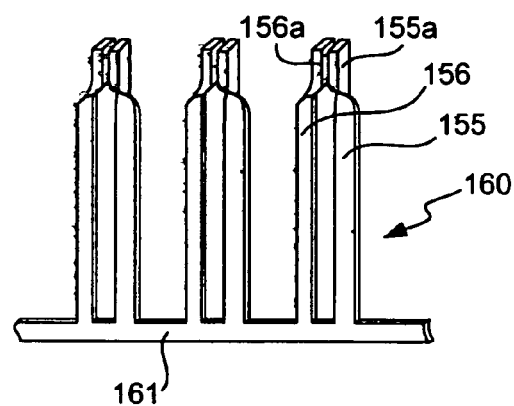

Next, each of the planar lead parts 155 and 156 is twisted by 90° by a press method as shown in FIG. 9B such that top end parts 155a and 156a of each pair of planar lead parts 155 and 156 face each other. In order to keep the lead terminals 55 and 56 in an elastic condition, it is preferable that the planar lead parts 155 and 156 of the lead frame 160 be twisted near their top end parts 155a and 156a.

Figure 9C:
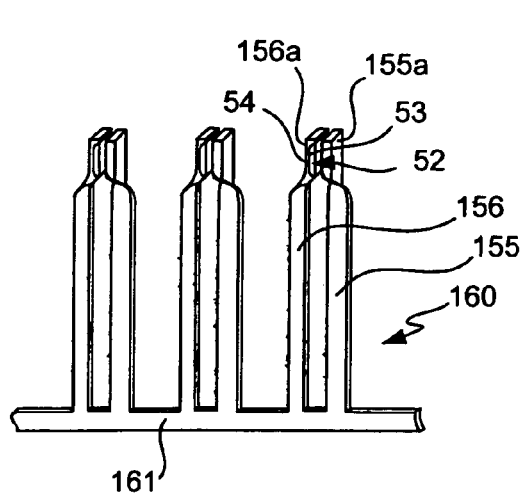
Figure 9D:
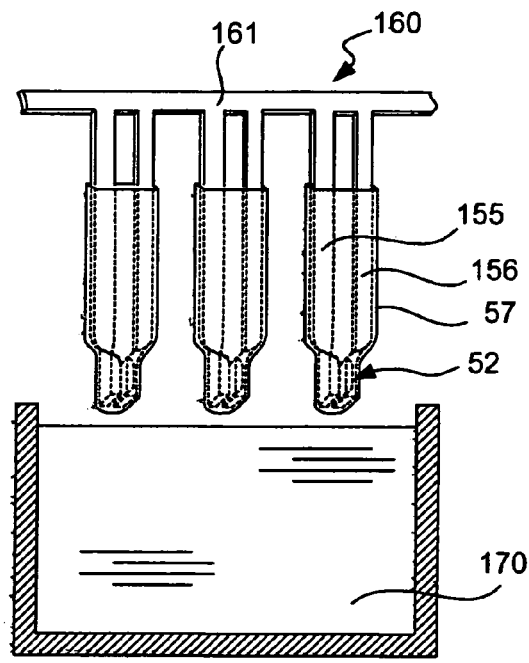

Next, as shown in FIG. 9C, the NTC thermistor element 52 is inserted in the gap between the top end parts 155a and 156a of each pair of planar lead parts 155 and 156 and the electrodes 53 and 54 on the main surfaces of the NTC thermistor element 52 are connected respectively to the top end parts 155a and 156a of the planar lead parts 155 and 156, say, by using a solder material (not shown).

Next, the lead frame 160 with many NTC thermistor elements 52 thus attached is held upside down such that the longitudinally elongated belt-like base part 161 will be above the planar led parts 155 and 156 and is lowered such that the NTC thermistor elements 52 and specified portions of the planar lead parts 155 and 156 are soaked in a polyethylene resin 170 which is later hardened. Thus, the NTC thermistor elements 52 and the specified portions of the planar lead parts 155 and 156 become covered with the outer cover 57.

Finally, the planar lead parts 155 and 156 are cut at specified positions and separated from the linearly elongated belt-like base part 161 of the lead frame 160 so as to obtain the individual temperature sensors 51 having the lead terminals 55 and 56 with desired lengths as shown in FIG. 7.

The temperature sensor 51 thus structured is advantageous wherein the terminal electrodes 53 and 54 on the main surfaces of the thermistor element 52 make surface-to-surface contacts with the top end parts 155a and 156a of the planar lead parts 155 and 156 over a relatively large area. This means that the solder can be applied over larger areas and hence the attachment can be made more secure and dependable. Thus, position and orientation of the thermistor element 52 are less likely to change.

Although the invention has been described above by way of only a small number of examples, these examples are not intended to limit the scope of the invention. Many modifications and variations are possible within the scope of this invention. For example, the temperature sensing element need not be an NYC thermistor but may well be a positive temperature coefficient (PTC) thermistor. It also goes without saying that the sensor of this invention can be used for measuring the temperature of many other kinds of electronic apparatus.

What is claimed is:

1. A method of producing temperature sensors, said method comprising the steps of:
   producing temperature sensing elements each having electrodes on mutually oppositely facing main surfaces thereof;
   forming a lead frame comprising a linearly elongated base part and a plurality of pairs of planar lead parts extending perpendicularly from said base part;
   twisting each of said planar lead parts such that each of said pairs has top end parts which face each other with a gap therebetween;
   inserting one of said temperature sensing elements between the mutually facing top end parts of each one of said pairs of planar lead parts in the corresponding gap and electrically connecting the electrodes on said inserted one temperature sensing element individually to the top end parts of said corresponding one pair of planar lead parts; and
   cutting each of said planar lead parts from said base part to form lead terminals of specified lengths for said temperature sensors.

2. The method of claim 1 further comprising the step of covering said temperature sensing elements and said planar lead parts with an electrically insulating material after said temperature sensing elements are attached to said lead frame.

3. The method of claim 1 further comprising the step of bending each of said planar lead parts to thereby provide a semicircular kinked part distal from the top end part such that the kinked parts of each of said pairs of planar lead parts are bent in a same direction with respect to each other and in a side-by-side relationship.

4. The method of claim 3 further comprising the step of covering said temperature sensing elements and said planar lead parts with an electrically insulating material after said temperature sensing elements are attached to said lead frame, said insulating material not covering said kinked parts.

* * * * *